(12) United States Patent
Edson et al.

(10) Patent No.: US 7,271,995 B2
(45) Date of Patent: *Sep. 18, 2007

(54) ELECTROLYTIC CAPACITOR WITH IMPROVED VOLUMETRIC EFFICIENCY

(75) Inventors: Douglas M. Edson, Kennebunk, ME (US); Glenn M. Vaillancourt, Saco, ME (US); Walter Koda, Brookfield, NH (US); Scott A. McCarthy, Saco, ME (US); James A. Fife, Myrtle Beach, SC (US)

(73) Assignee: AVX Corporation, Myrtle Beach, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 10/992,556

(22) Filed: Nov. 18, 2004

(65) Prior Publication Data

US 2005/0088805 A1    Apr. 28, 2005

Related U.S. Application Data

(63) Continuation of application No. 10/265,919, filed on Oct. 7, 2002, now Pat. No. 6,870,727.

(51) Int. Cl.
  *H01G 4/228* (2006.01)
  *H01G 4/00* (2006.01)
(52) U.S. Cl. ............... 361/540; 361/538; 361/529
(58) Field of Classification Search ........ 361/536–540, 361/523, 528–529, 532–533
  See application file for complete search history.

(56) References Cited

U.S. PATENT DOCUMENTS 2,936,514 A * 5/1960 Millard ............... 29/25.03

3,588,628 A    6/1971 Beck (Continued)

FOREIGN PATENT DOCUMENTS

EP    1 0615372 A2    12/2000

(Continued)

OTHER PUBLICATIONS

Abstract of Japanese Patent No. JP01-227422, Mar. 7, 1988.

(Continued)

*Primary Examiner*—Eric W. Thomas
(74) *Attorney, Agent, or Firm*—Dority & Manning, P A

(57) ABSTRACT

Surface mount electrolytic capacitors are provided with anode and cathode terminations having respective first termination portions provided on the bottom surface of a molded package in a generally coplanar configuration. A second cathode termination portion is bent in a generally perpendicular fashion to the first cathode termination portion and may then be adhered to the external cathode layer of a capacitor body. A second anode termination portion is bent in a generally perpendicular fashion to the first anode termination portion and may then be welded to an anode wire connected to and extending from the capacitor body. An insulation pad may be provided between the first anode termination portion and the capacitor body to prevent device shorting. A planar termination frame may be provided to form the electrolytic capacitors of the present subject matter. Additional embodiments of the disclosed technology include additional termination portions to effect wrap-around surface-mount anode and cathode terminations.

40 Claims, 11 Drawing Sheets

U.S. PATENT DOCUMENTS

| | | | |
|---|---|---|---|
| 3,781,976 A | 1/1974 | Tomiwa | |
| 3,789,274 A | 1/1974 | Pfister | |
| 3,828,227 A * | 8/1974 | Millard et al. | 361/540 |
| 3,997,821 A | 12/1976 | Sternbeck | |
| 4,017,773 A | 4/1977 | Cheseldine | |
| 4,107,762 A | 8/1978 | Shirn et al. | |
| 4,247,883 A | 1/1981 | Thompson et al. | |
| 4,288,842 A | 9/1981 | Voyles | |
| 4,488,204 A | 12/1984 | Beck, Jr. | |
| 4,497,105 A | 2/1985 | Uemura | |
| 4,571,662 A | 2/1986 | Conquest et al. | |
| 4,675,790 A | 6/1987 | DeMatos et al. | |
| 4,972,299 A | 11/1990 | Hagiwara et al. | |
| 5,198,968 A | 3/1993 | Galvagni | |
| 5,390,074 A | 2/1995 | Hasegawa et al. | |
| 5,461,537 A * | 10/1995 | Kobayashi et al. | 361/525 |
| 5,477,030 A | 12/1995 | Buckshaw et al. | |
| 5,840,086 A | 11/1998 | Takami et al. | |
| 6,017,367 A | 1/2000 | Nakata | |
| 6,236,561 B1 | 5/2001 | Ogino et al. | |
| 6,262,878 B1 * | 7/2001 | Shirashige et al. | 361/508 |
| 6,333,844 B1 * | 12/2001 | Nakamura | 361/523 |
| 6,400,556 B1 | 6/2002 | Masuda et al. | |
| 6,430,034 B2 | 8/2002 | Sano et al. | |
| 6,467,142 B1 | 10/2002 | Shirashige et al. | |
| 6,519,135 B2 | 2/2003 | Sano et al. | |
| 6,616,713 B2 | 9/2003 | Sano et al. | |
| 6,717,793 B2 | 4/2004 | Arai et al. | |
| 6,751,086 B2 | 6/2004 | Matsumoto | |
| 6,808,541 B2 | 10/2004 | Maeda | |
| 6,870,727 B2 * | 3/2005 | Edson et al. | 361/523 |
| 6,882,521 B2 | 4/2005 | Tsutsui et al. | |
| 6,903,921 B2 | 6/2005 | Ishijima | |
| 2002/0163775 A1 | 11/2002 | Maeda | |
| 2003/0039093 A1 | 2/2003 | Tadanobu et al. | |
| 2003/0104923 A1 * | 6/2003 | Omori et al. | 501/134 |
| 2003/0151884 A1 * | 8/2003 | Matsumoto | 361/523 |

FOREIGN PATENT DOCUMENTS

| | | |
|---|---|---|
| GB | 2 123610 A | 2/1984 |
| JP | 5 547449 | 11/1980 |
| JP | 1 29050 | 6/1989 |
| JP | 0 1276613 | 7/1989 |
| JP | 5 234828 | 9/1993 |
| JP | H7 106204 | 4/1995 |
| JP | H11 87175 | 3/1999 |
| JP | 1 1288844 | 10/1999 |
| JP | 2000-49048 * | 2/2000 |
| JP | 2001-291641 * | 10/2001 |

OTHER PUBLICATIONS

Abstract of Japanese Patent No. JP02-087612, Sep. 11, 1989.
Abstract of Japanese Patent No. JP06-005478, Jan. 14, 1994.
Abstract of Japanese Patent No. JP08-130166, May 21, 1996.
Abstract of Japanese Patent No. JP2001110676, Apr. 20, 2001.
Abstract of Japanese Patent No. JP7106204, Apr. 21, 1995.
Abstract of Japanese Patent No. JP7240343, Sep. 12, 1995.

* cited by examiner

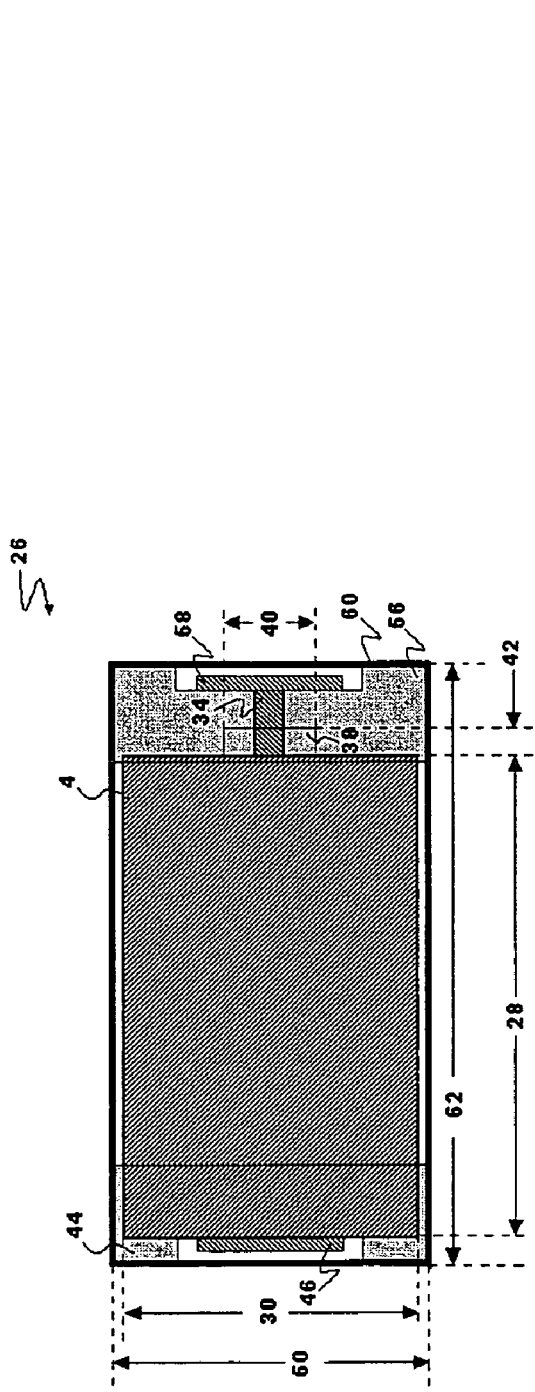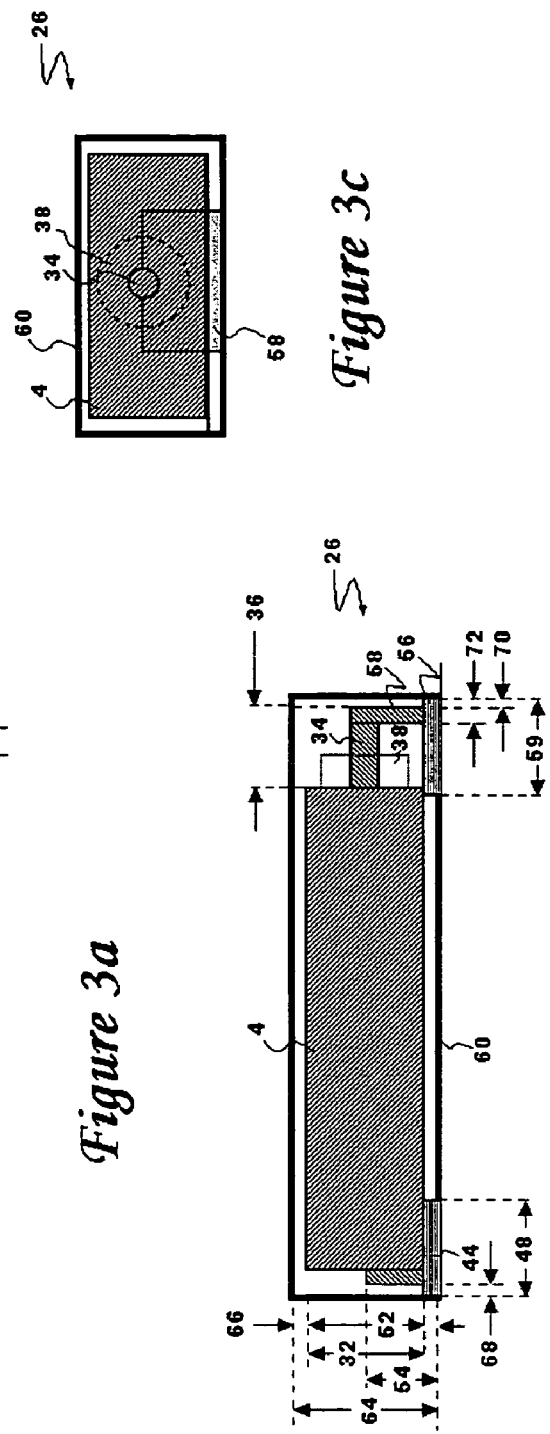
Figure 3a
Figure 3b
Figure 3c

1

ELECTROLYTIC CAPACITOR WITH IMPROVED VOLUMETRIC EFFICIENCY

RELATED APPLICATIONS

The present application is a continuation of U.S. application Ser. No. 10/265,919, which was filed on Oct. 7, 2002 now U.S. Pat. No. 6,870,727.

FIELD OF THE INVENTION

The present subject matter generally relates to electrolytic chip capacitors, and more particularly relates to an electrolytic chip capacitor with terminations located generally on a bottom surface of the device and with a packaged configuration that facilitates increased volumetric efficiency and a corresponding potential for a slim capacitor profile. The present subject matter equally relates to a method for forming such electrolytic capacitors.

BACKGROUND OF THE INVENTION

Electrolytic capacitors, such as tantalum capacitors, are traditionally known for their high capacitance value and compactness. Despite the existing compactness of known electrolytic capacitors and electrolytic capacitor arrays, there are constant efforts to reduce the volume and corresponding volumetric efficiency of such electronic components.

Essential components of a conventional electrolytic capacitor include a main capacitor body, an anode wire, and a leadframe all molded together in an encapsulating resin package. The volumetric efficiency of an electrolytic capacitor is typically defined as the ratio of the main capacitor body volume to the volume of the entire molded capacitor package. The anode wire and leadframe of such capacitors form respective positive and negative electrical connections to the capacitor structure. These electrical connections typically extend axially from the capacitor structure, and often take up a significant amount of space inside the capacitor package.

Many known technological endeavors have addressed the desire for tantalum or other types of electrolytic capacitors with improved volumetric efficiency. U.S. Pat. No. 6,400,556 (Masuda et al.) discloses a solid electrolytic capacitor with eliminated redundant space, improved volumetric efficiency and a low profile. U.S. Pat. No. 5,198,968 (Galvagni) concerns a compact surface mount tantalum capacitor with high capacitance per volume.

The prevalent desire to reduce the component size of electrolytic capacitors becomes even more advantageous when such capacitors are employed in circuit board applications. Thus, chip-type electrolytic capacitors, an example of which is disclosed in U.S. Pat. No. 6,017,367 (Nakata), have been designed not only with volumetric performance characteristics in mind, but also such that device mounting to a substrate is facilitated. Such facilitated device mounting is often achieved by configuring both electrical terminations to extend from a selected surface of the capacitor. Examples of this technology can be found in U.S. Pat. No. 4,107,762 (Shirn et al.), U.S. Pat. No. 4,017,773 (Cheseldine) and U.S. Pat. No. 3,789,274 (Pfister).

When both device terminations extend to a selected surface of a chip-type capacitor, it is often desirable to provide such electrical connections in a generally coplanar fashion. A coplanar termination arrangement may facilitate device mounting to a substrate and may also help to maintain uniformity of certain electrical characteristics of the device. U.S. Pat. No. 5,198,968 (Galvagni) discloses a surface mount tantalum capacitor with coplanar terminations. Similarly, U.S. Pat. No. 6,236,561 (Ogino et al.) discloses an exemplary chip type capacitor with exposed anode and cathode portions flush with a surface of the capacitor device such that dual terminations are provided in a generally coplanar arrangement. This particular configuration is also intended to increase capacitor volume.

While examples of various aspects and alternative embodiments are known in the field of electrolytic capacitors, no one design is known that generally encompasses all of the above-referenced and other preferred capacitor characteristics.

The disclosures of foregoing United States patents are hereby fully incorporated into this application for all purposes by reference thereto.

BRIEF SUMMARY OF THE INVENTION

The present subject matter recognizes and addresses various of the foregoing drawbacks and other shortcomings encountered in the prior art of electrolytic capacitor technology. Thus, broadly speaking, a principal object of the presently disclosed technology is to provide an improved electrolytic capacitor with coplanar terminations on a selected surface of a capacitor chip.

Another principal object of the present subject matter is to provide a surface mount electrolytic capacitor with improved volumetric efficiency. Such improved volumetric efficiency enables certain embodiments of the present subject matter to be formed with reduced case sizing and a slim profile, such as less than about 0.050" in some embodiments.

A still further object of the present subject matter is to provide versatile termination options such that certain embodiments of the present technology may include termination portions that are generally configured along a bottom surface of a capacitor device, but that may also wrap around to adjacent sides of the device.

The present subject matter equally concerns methodology for forming surface mount electrolytic capacitors with improved volumetric efficiency. Such methodology affords simplified process steps and also helps ensure that the anode and cathode terminations of the present subject matter are provided in a coplanar relationship to the molded package.

Additional objects and advantages of the present subject matter are set forth in, or will be apparent to those of ordinary skill in the art from, the detailed description herein. Also, it should be further appreciated by those of ordinary skill in the art that modifications and variations to the specifically illustrated, referenced, and discussed features and steps hereof may be practiced in various embodiments and uses of this invention without departing from the spirit and scope thereof, by virtue of present reference thereto. Such variations may include, but are not limited to, substitution of equivalent means and features, materials, or steps for those shown, referenced, or discussed, and the functional, operational, or positional reversal of various parts, features, steps, or the like.

Still further, it is to be understood that different embodiments, especially different presently preferred embodiments, of this invention may include various combinations or configurations of presently disclosed features, steps, or elements, or their equivalents (including combinations of features or steps or configurations thereof not expressly shown in the figures or stated in the detailed description).

Some embodiments of the present subject matter provide for a surface mount electrolytic capacitor comprising a capacitor body, an anode termination, a cathode termination and a molded package. A capacitor body in accordance with the disclosed technology may comprise an anode body and an anode wire having a first end provided in connection to the anode body and a second end extending therefrom. The anode wire thus forms a first electrical connection for the electrolytic capacitor. The anode body may then be substantially surrounded with at least one intermediate layer, such as an oxide layer and an electrolyte layer in one exemplary embodiment. A cathode layer then preferably surrounds the intermediate layer(s) to provide a second electrical connection for the electrolytic capacitor. The resultant electrolytic capacitor body may be generally rectangular in shape and characterized by respective top and bottom surfaces.

Anode and cathode terminations in accordance with such exemplary electrolytic capacitor embodiments respectively include at least first and second portions. The first anode and cathode termination portions are preferably configured in a generally coplanar relationship, in a plane that is generally parallel to the top and bottom surfaces of the capacitor body. The second anode termination portion may be positioned in a generally perpendicular direction to the first anode termination portion and provided in electrical connection to the anode wire of the capacitor body. The second cathode termination portion may be positioned in a generally perpendicular direction to the first cathode termination portion and provided in electrical connection to the cathode layer of the capacitor body. A generally rectangular molded package may then encapsulate the electrolytic capacitor while exposing the first anode termination portion and the first cathode termination portion. These exposed first termination portions ultimately effect surface mount electrical connection to the electrolytic capacitors.

In still further electrolytic capacitor embodiments of the present subject matter, the anode and cathode terminations may also include respective third and fourth termination portions to effect wrap-around surface mount terminations. Third and fourth anode termination portions are provided in a generally perpendicular direction to the first anode termination portion, while third and fourth cathode termination portions are provided in a generally perpendicular direction to the first cathode termination portion. In some more particular embodiments, the third and fourth anode termination portions are both provided along a single selected side surface of the molded package, and the third and fourth cathode termination portions are also both provided along a single selected side surface of the molded package, whereby such first and second selected side surfaces may oppose one another. In other more particular embodiments, the third and fourth anode termination portions are provided along opposing respective side surfaces, while third and fourth cathode termination portions are similarly provided along opposing respective side surfaces.

The present subject matter equally concerns methodology for forming surface mount electrolytic capacitors having a generally rectangular encapsulated body with first and second terminations provided in a generally coplanar arrangement with a selected surface of the encapsulated body. A first exemplary step in such methodology may correspond to providing a generally planar termination frame defined by at least first and second anode termination portions and first and second cathode termination portions. The second cathode termination portion may be bent to be generally perpendicular to the first cathode termination portion, at which point a capacitor body may be adhered to the cathode termination via conductive epoxy or other adhesive material. The second anode termination portion may be bent to be generally perpendicular to the first anode termination portion and to be provided in electrical connection with an anode wire extending from the capacitor body. The connected anode wire and second anode termination portion may be welded together to ensure connection. The capacitor body may then be encapsulated in a molded resin package.

Additional methodology in accordance with the disclosed technology concerns the formation of surface mount electrolytic capacitors with wrap-around terminations. Similar to the above-referenced methodology, a termination frame is provided, but has first, second, third and fourth respective anode and cathode termination portions. The step of encapsulating the capacitor body may leave respective first, third, and fourth termination portions exposed, such that selected of the third and fourth anode and cathode termination portions may be bent in a generally perpendicular direction to their respective first termination portions.

Additional embodiments of the present subject matter, not necessarily expressed in this summarized section, may include and incorporate various combinations of aspects of features or parts referenced in the summarized objectives above, and/or features or parts as otherwise discussed in this application.

Those of ordinary skill in the art will better appreciate the features and aspects of such embodiments, and others, upon review of the remainder of the specification.

BRIEF DESCRIPTION OF THE DRAWINGS

The above and other aspects, features, and advantages of the present invention, including the best mode thereof, will be more apparent from the following more particular description of the present subject matter, presented in conjunction with the appended figures, in which:

FIG. 3a illustrates a bottom view of a surface mount electrolytic capacitor in accordance with the present subject matter;

FIG. 3b illustrates a first side view of a surface mount electrolytic capacitor in accordance with the present subject matter;

FIG. 3c illustrates a second side view of a surface mount electrolytic capacitor in accordance with the present subject matter;

Figure 1A:
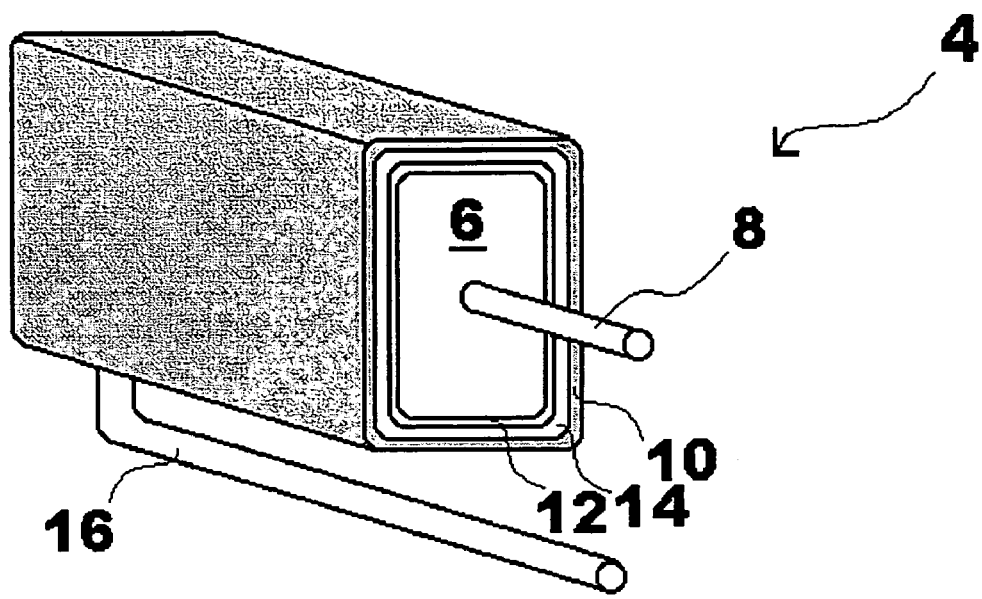
FIGS. 1a and 1b illustrate an exemplary known configuration of an electrolytic capacitor with anode wire and leadframe portions extending axially from a molded device package.

Repeat use of reference characters throughout the present specification and appended drawings is intended to represent same or analogous features or elements of the presently disclosed electrolytic capacitor technology.

DETAILED DESCRIPTION OF THE DRAWINGS

The following description is of the best mode presently contemplated for carrying out the invention. The description is made merely for the purpose of describing the general principles of the invention. It should be noted that the exemplary embodiments disclosed herein should not insinuate any limitations of the subject matter. Features illustrated or discussed as part of one embodiment can be used on another embodiment to yield a still further embodiment. Additionally, certain features may be interchanged with similar devices or features not expressly mentioned which perform the same or similar function.

Figure 1B:
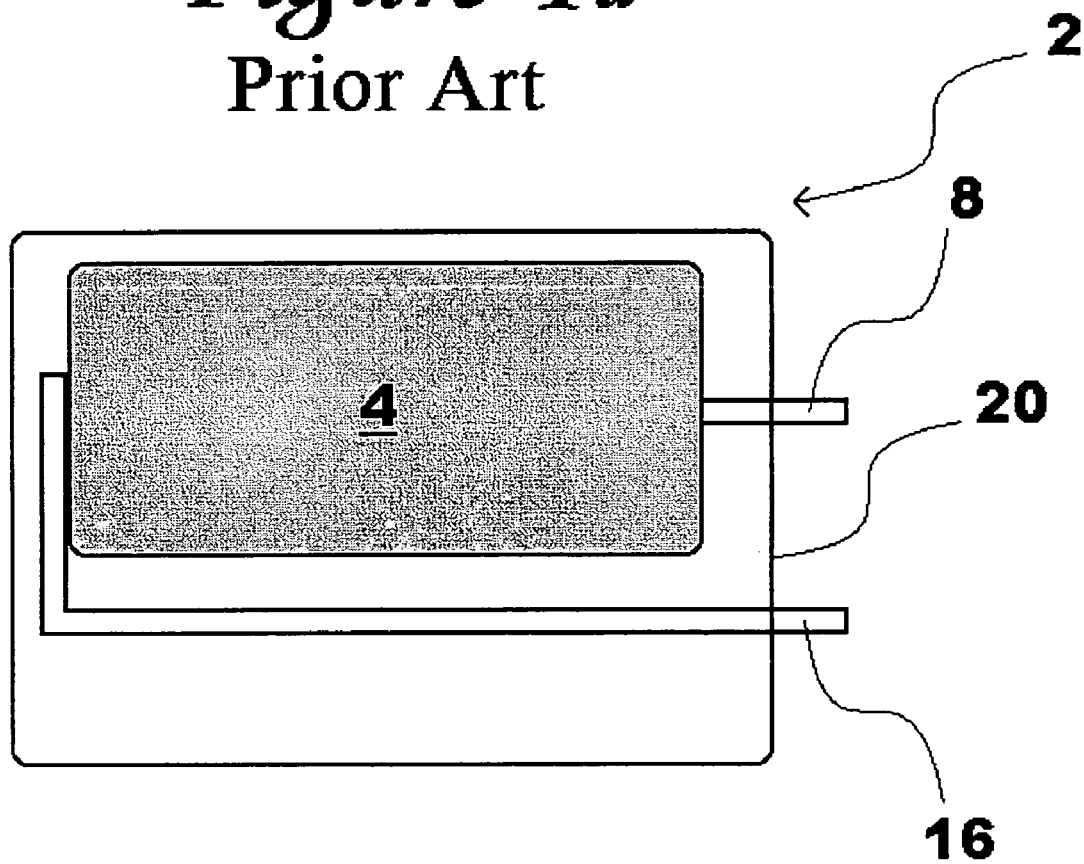

The present subject matter generally concerns surface mount electrolytic capacitors with increased volumetric efficiency. Known electrolytic capacitor designs, such as illustrated in FIGS. 1a and 1b, include anode wire and leadframe portions that extend axially from a capacitor body. Such configurations are generally characterized by poor volumetric efficiency.

Figure 2:
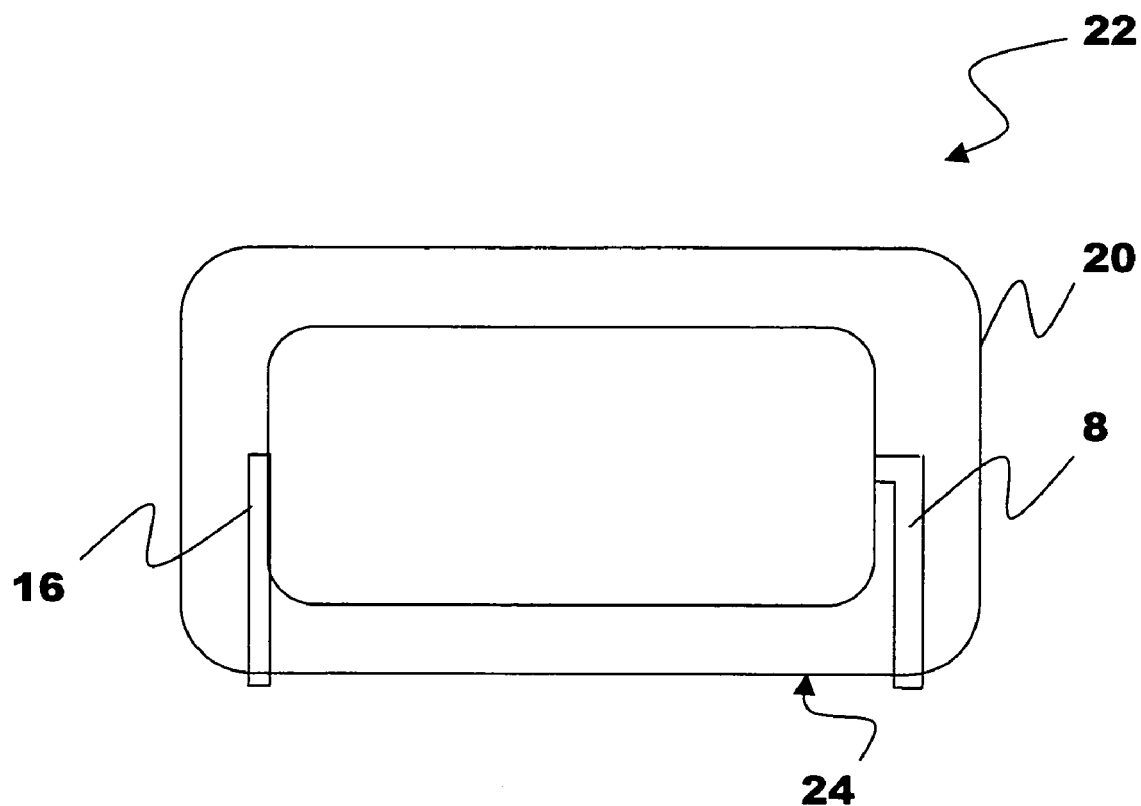
FIG. 2 illustrates an exemplary electrolytic capacitor configuration with anode wire and leadframe portions extending to a bottom surface of a molded device package in accordance with the present subject matter.

The present subject matter concerns improved surface mount electrolytic capacitor technology, which generally provides for terminations that extend to a bottom surface of a capacitive device, such as depicted in FIG. 2. Such configurations in accordance with the disclosed embodiments facilitate reduced-cost formation of an electrolytic capacitor with improved volumetric efficiency and potential for a slim device profile. The volumetric characteristics enable the use of a larger anode in a component package having a given size. Such improved surface mount electrolytic capacitors offer potential advantages for high reliability circuit applications such as medical implantable, military, and aerospace applications.

A first exemplary embodiment of the subject surface mount electrolytic capacitor technology is displayed in FIGS. 3a, 3b, 3c, 4a and 4b. The specific dimensions disclosed in FIGS. 3a–3c, respectively, may also be applied to additionally disclosed embodiments of the present subject matter. A second exemplary embodiment of the subject surface mount electrolytic capacitor technology is displayed in FIGS. 6a–6d, respectively. Further, a third exemplary embodiment of the present subject matter is depicted in FIGS. 8a–8d respectively.

The present subject matter also concerns corresponding methodology for forming surface mount electrolytic capacitor embodiments. A specific component that may be utilized in such methodology is a termination frame, exemplary embodiments of which are disclosed in respective FIGS. 5, 7 and 9. Electrolytic capacitor bodies may be positioned with a termination frame, which is then bended or shaped to form generally coplanar surface mount capacitor terminations.

Now with more particular reference to the drawings, FIG. 1b displays an exemplary known electrolytic capacitor embodiment 2 with electrical connections provided in an axial configuration. A significant element of such an electrolytic capacitor is the capacitor body 4. The exemplary capacitor body 4 illustrated in FIGS. 1a and 1b comprises an anode slug, or anode body, 6 which typically corresponds to a generally rectangular or cylindrical portion of anodizable material.

Exemplary valve metals or other materials that may be utilized in anode body 6 include anodizable metals such as Tantalum, Niobium, Titanium, Aluminum, and any alloyed combination of such metals or other valve metals, anodizable metal nitrides such as Tantalum Nitride and Niobium Nitride, and anodizable metal oxides such as Niobium Oxide. It should be appreciated that many different variations of reduced Niobium Oxides may be suitable for use in an anode body of the present technology.

An anode wire 8 (also referred to as an anode lead or a lead wire) is utilized to form a first electrical connection to the capacitor body 4. A first end of anode wire 8 is connected to anode body 6 and a second end extends axially from anode body 6. The first end of anode wire 8 may be embedded within anode body 6 or it may alternatively be welded thereto.

A substantial portion of anode body 6 is then preferably coated with at least one intermediate layer before being coated with a cathode layer 10, which provides a second electrical connection for capacitor body 4. In more particular exemplary embodiments of the present subject matter, the intermediate layers provided between anode body 6 and cathode layer 10 include an oxide layer 12 and an electrolyte layer 14 (or alternate conductive layer.) A leadframe 16 is then typically positioned in contact with cathode layer 10 to provide an extended electrical connection to capacitor body 4.

It should be appreciated that additional layers and other features as would be within the purview of one of ordinary skill in the art of capacitor technology may also be included in the formation of electrolytic capacitor body 4 while remaining within the spirit and scope of the present subject matter.

Referring to FIG. 1b, a portion of leadframe 16 may typically be provided adjacent to capacitor body 4, and then bent at angle of about ninety degrees such that it extends axially in a generally parallel fashion to anode wire 8. Capacitor body 4, a portion of anode wire 8 and a portion of leadframe 16 are then preferably encapsulated in a molded resin package 20 that protects the encapsulated elements and secures both anode wire 8 and leadframe 16 in their resultant axial configuration. Anode wire 8 and leadframe 16 may extend axially from the same selected side of electrolytic capacitor 2 (as shown in FIG. 1b) or from opposing sides. Regardless, electrical connections provided in an axial fashion typically leave a substantial amount of "unused" room within molded package 20, thus characterizing electrolytic capacitor 2 by relatively poor volumetric efficiency.

In accordance with the presently disclosed technology, an improved termination arrangement yields greater volumetric efficiency for electrolytic capacitor designs. Referring to FIG. 2, an exemplary electrolytic capacitor 22 includes a capacitor body 4 with leadframe 16 and anode wire 8 that extend out of bottom surface 24 of molded package 20. Such configuration with bottom terminations provides for a capacitor design with a volumetric efficiency that nearly doubles that of exemplary configurations with axial terminations. Providing a capacitor with bottom terminations in accordance with the present subject matter yields improvements in an ability to mount such a capacitor to a printed circuit board or other substrate, thus yielding improved "surface mount" electrolytic capacitors.

General aspects of the exemplary capacitor embodiment 22 of FIG. 2 are set forth more particularly in FIGS. 3a–9, respectively, in accordance with a detailed description of exemplary embodiments of the disclosed technology. FIGS. 3a–3c, respectively, illustrate a first exemplary electrolytic capacitor embodiment 26 in accordance with the disclosed technology, including exemplary dimensions for such electrolytic capacitor. Although described with respect to first exemplary embodiment 26, selected dimensions as displayed in FIGS. 3a, 3b and 3c may also be applied to other electrolytic capacitor embodiments in accordance with the present subject matter.

It should be appreciated that such figures may not be drawn to scale, and that selected elements of each figure may not be represented in proportion to other elements in that figure. It should also be appreciated that for the sake of convenience, FIG. 3a is referred to as a generally bottom view, FIG. 3b is referred to as a first side view, and FIG. 3c is referred to as a second side view. For additional convenience, distances between top and bottom portions of electrolytic capacitor 26 are referenced as height (or profile), distances between first sides of electrolytic capacitor 26 are referenced as width, and distances between second sides of electrolytic capacitor 26 are referenced as length.

Now referring to FIGS. 3a–3c, respectively, electrolytic capacitor 26 includes a capacitor body 4, with exemplary length 28 of about 0.165" (inches), exemplary width 30 of about 0.100", and exemplary height 32 of about 0.040", yielding a volume of about 0.00066 in.$^3$ An anode wire 34 extends from capacitor body 4, and has an exemplary radius of about 0.005" and a length 36 extending out of capacitor body 4 of about 0.030". A Teflon washer 38 may be placed around the anode wire 34 to provide additional support for such first electrical connection. Washer 38 may have an exemplary diameter 40 of about 0.030" and an exemplary width 42 of about 0.012". As an alternative to washer 38, a green Teflon paint or other appropriate coating may be applied to provide additional support for anode wire 34. The applied Teflon paint or other green coating may be further strengthened upon later firing processes as typically associated with capacitor formation.

A cathode termination serves the function of a conventional leadframe element, and comprises a first portion 44 and second portion 46. First portion 44 is provided in a plane that is generally parallel to the top and bottom surfaces of capacitor body 4, and may be characterized by a length 48 of about 0.035", a width 50 generally spanning the entire width of capacitor 26 (about 0.110",) and a height 52 of about 0.005". Second portion 46 of the cathode termination is provided generally perpendicular to first portion 44, and is adjacent to and in electrical connection with capacitor body 4. The second portion 46 may have a thickness (or width) that is generally equivalent to the height of first portion 44 (e.g., about 0.005"), and may have an exemplary height 54 of about 0.025". Thus, as shown, the second portion 46 has a height that is greater than its thickness.

An anode termination is provided to connect to anode wire 34 and preferably comprises a first portion 56 and a second portion 58. First portion 56 is provided in a plane that is generally parallel to the top and bottom surfaces of capacitor body 4, and may be characterized by a length 60 of about 0.035" and exemplary width and height dimensions similar to the first cathode termination portion 44 (e.g. width of about 0.110" and a height of about 0.005"). The second anode termination portion 58 is generally perpendicular to first anode termination portion 56 and may be designed to fit around anode wire 34 as shown in FIG. 3c. As shown, the second portion 58 also has a thickness (or width) that is generally equivalent to the height of the first portion 56 (e.g. about 0.005"), and a height that is greater than its thickness.

A molded package 60 is provided to encapsulate portions of capacitor 26 and offer protection for such encapsulated components as capacitor body 4, anode wire 34, second cathode termination portion 46 and second anode termination portion 58. Molded package 60 may have an exemplary length 62 of about 0.210", an exemplary width 50 of about 0.110" and an exemplary height 64 of about 0.050", yielding a volume of about 0.001155 in.$^3$ Molded package 60 may be formed with respective clearance distances 66, 68 and 70 of about 0.005" each. Distance 72 may be about 0.010".

It should be appreciated that the specific dimensions presented above with respect to FIGS. 3a–3c, respectively, provide for an electrolytic capacitor with a relatively slim profile of about 0.050". The improved termination arrangement of the present subject matter enables a reduced capacitor profile of 0.050" or less, but the scope of the present technology should in no way be limited to such reduced profile range. By employing a larger anode body and similar clearance range between the anode body, molded package and other elements, an electrolytic capacitor with a larger profile and also a larger volumetric efficiency may be enabled.

Since volumetric efficiency is defined as the ratio of capacitor body volume to the volume of the molded package, the volumetric efficiency of the electrolytic capacitor 26 of FIGS. 3a–3c respectively is about 57.14%. Alterations to the specific dimensions illustrated in FIGS. 3a and 3b, and in particular to the size of the anode body and/or the size of the molded package, may yield electrolytic capacitor embodiments with volumetric efficiency above or below 57.14%. It should be appreciated that such potential range for volumetric efficiency of an electrolytic capacitor in accordance with the present subject matter should at least be inclusive of between about 55% to about 60%, and may yield an even higher volumetric efficiency in accordance with further embodiments of the disclosed technology.

Figure 4A:
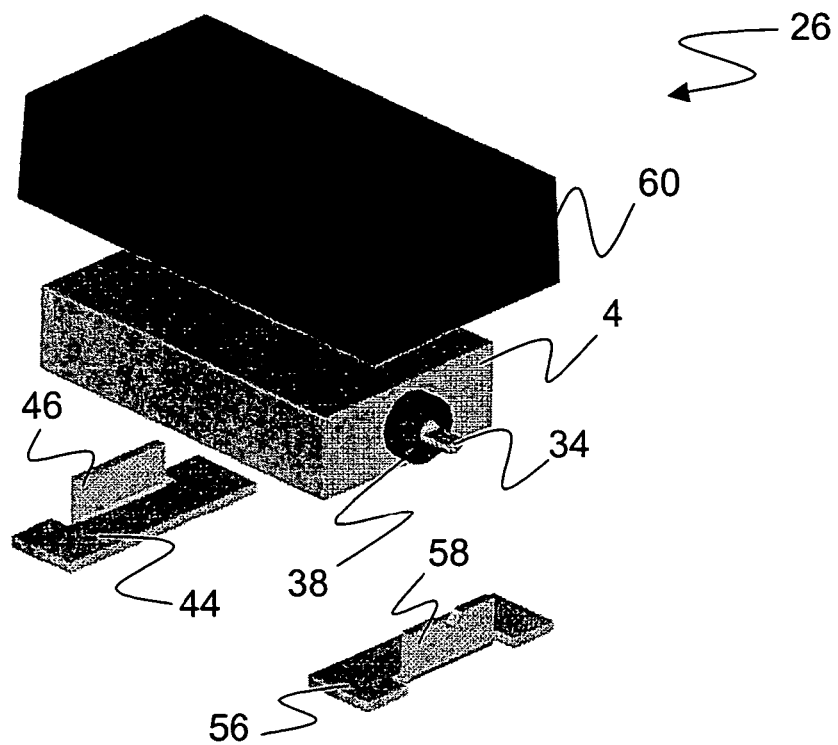
FIG. 4a displays an exploded side view with top perspective of a first exemplary surface mount electrolytic capacitor embodiment of the disclosed technology.
Figure 4B:
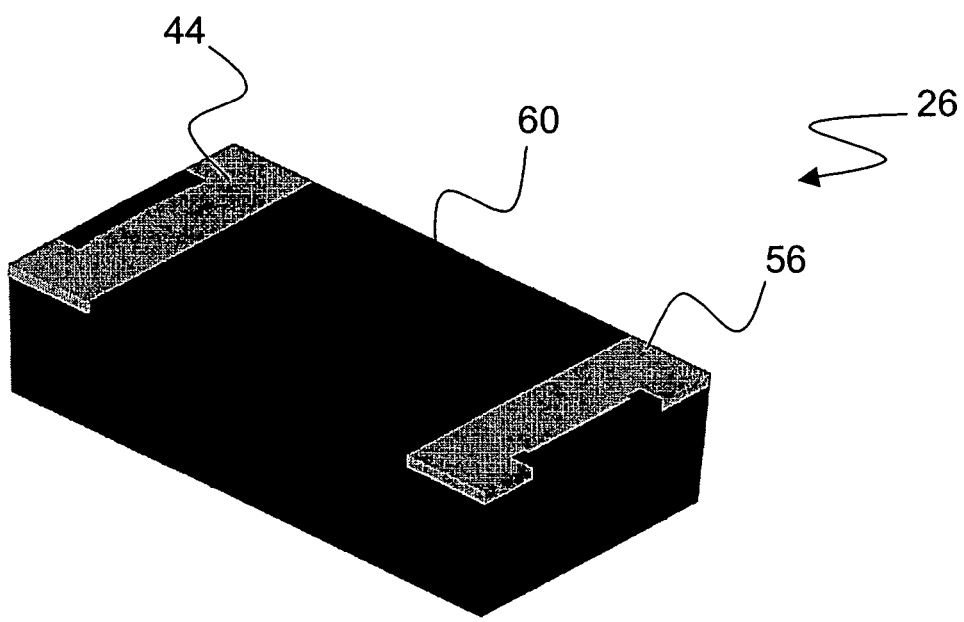
FIG. 4b displays a side view with bottom perspective of a first exemplary surface mount electrolytic capacitor embodiment of the disclosed technology.

Additional views of first exemplary electrolytic capacitor 26 are shown in FIGS. 4a and 4b. FIG. 4a shows a generally side exploded view with top perspective and FIG. 4b shows a generally side view with bottom perspective of exemplary electrolytic capacitor 26. Anode wire 34 extends from a selected side of capacitor body 4 and may be provided with a washer 38 thereon. As previously mentioned, Teflon paint or other coatings may be substituted for the washer 38. Second anode termination portion 58 is configured for adjacent position against and electrical connection to anode wire 34. Second cathode termination portion 46 is configured for adjacent position to and electrical connection to capacitor body 4, and more particularly to the cathode layer that substantially surrounds capacitor body 4.

First cathode termination portion 44 and first anode termination portion 56 are both formed in a generally coplanar relationship with one another and remain exposed (as shown in FIG. 4b) after other elements of capacitor 26 are encapsulated in molded package 60. Respective first portions 44 and 56 may both be generally U-shaped in configuration, as is further presented with respect to the termination frame embodiment of FIG. 5.

Molded package 60 may for example be formed of a thermoplastic or thermoset resin compound that is molded around selected portions of electrolytic capacitor 26 to totally encapsulate the capacitor body and portions of the metallized anode and cathode terminations. It should be appreciated that other protective features than encapsulation (e.g., providing a cover) are within the purview of one of ordinary skill in the art, and should be considered within the scope of the present technology.

A significant feature of the electrolytic capacitor designs in accordance with the disclosed technology is that the first anode termination portion 56 and the first cathode termination portion 44 remain in a substantially coplanar relationship with one another and with a surface of the molded package. Particular methodology associated with forming electrolytic capacitors of the present subject matter helps to ensure such a coplanar relationship. Aspects of such methodology are presented hereafter with respect to FIG. 5.

Figure 5:
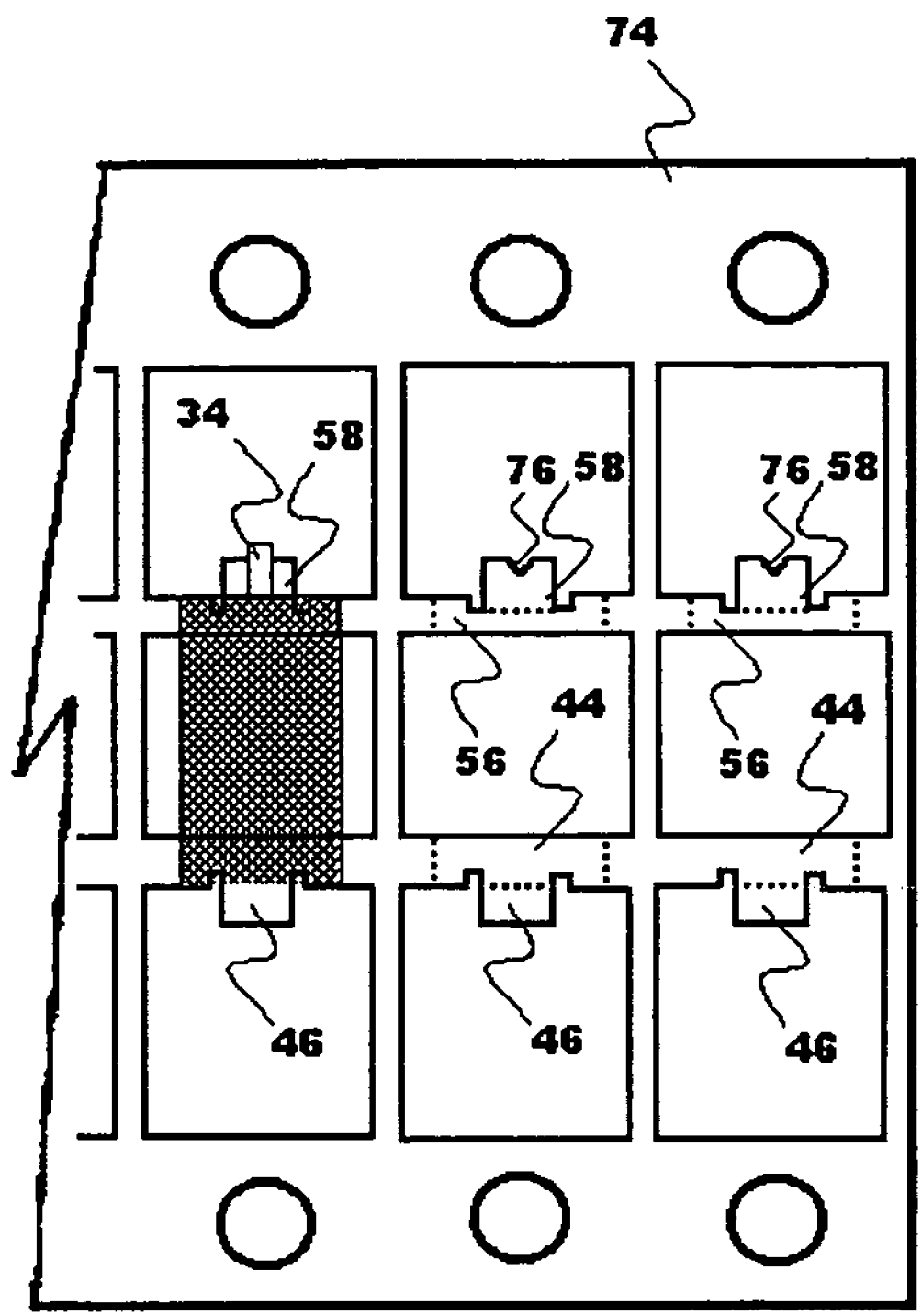
FIG. 5 illustrates an exemplary termination frame for use in accordance with the first exemplary surface mount electrolytic capacitor embodiment disclosed in FIGS. 4a and 4b.

FIG. 5 displays an exemplary termination frame 74 that may be used in forming electrolytic capacitors in accordance with the present subject matter. Termination frame 74 may correspond to a metallized structure, for example one made of stamped electroplated wire, that forms first and second respective portions of the anode and cathode terminations. Specific exemplary materials that may be used in forming metallized termination frame include OLIN Alloy Nos. 42, 194, 725, 752 or other suitable termination frame materials. A termination frame typically includes portions for forming a plurality of electrolytic capacitors (for example, three such portions are shown in FIG. 5), and may be utilized with any number of singular or plural component formation.

A first step in forming exemplary electrolytic capacitor 26 while utilizing exemplary termination frame 74 is to bend up each second cathode termination portion 46 such that it is in a generally perpendicular relationship to first cathode termination portion 44. Respective capacitor bodies 4 are then preferably arranged within the termination frame and adhered to the cathode termination via conductive epoxy or other appropriate adhesive material as within the purview of one of ordinary skill in the art. Each second anode termination portion 58 is then preferably bent up such that it is in a generally perpendicular relationship to first anode termination portion 56. Each second anode termination portion 58 preferably contains a semicircular cut-out 76 to accommodate anode wire 34 as second portion 58 and anode wire 34 are configured adjacent to one another. An electrical connection between such adjacent components may then be further facilitated by welding (e.g, via resistance welding or laser welding techniques) each anode wire 34 to each second anode termination portion 58.

Additional exemplary steps in the subject methodology for forming electrolytic capacitors 26 include encapsulating each capacitor body and respective anode wire and termination portions within respective molded resin packages. Termination frame 74 can then be diced among distinct capacitors and respective portions of the terminations thereof such that multiple surface mount electrolytic capacitors are effected.

Figure 6A:
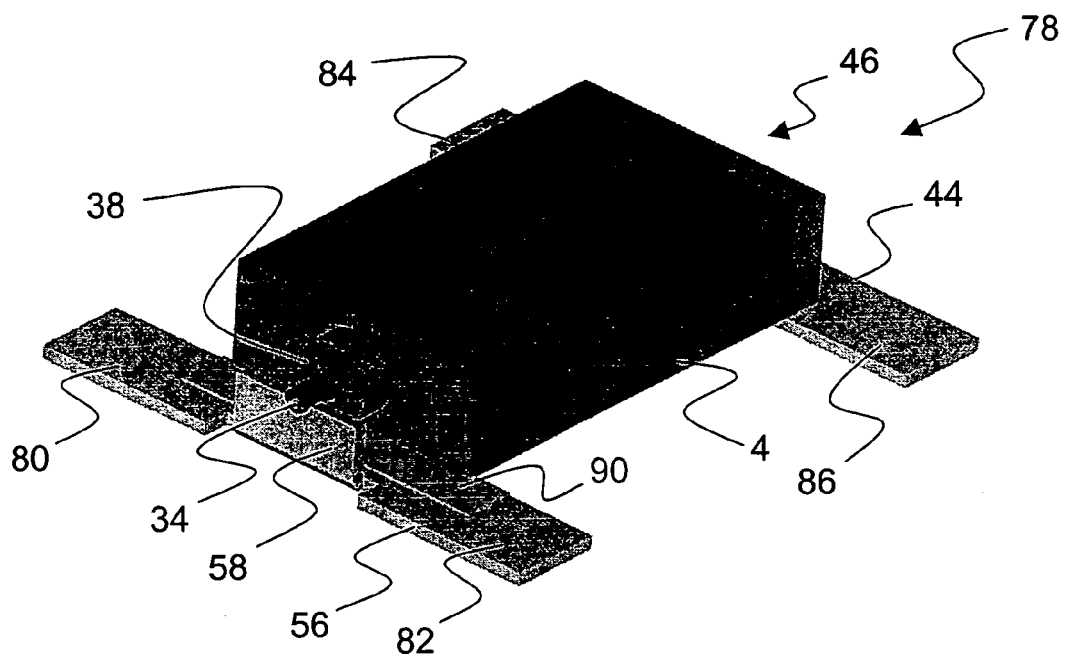
FIG. 6a displays a side view with top perspective of a second exemplary surface mount electrolytic capacitor embodiment of the disclosed technology before encapsulation.

Now referring to FIGS. 6a–6d, respectively, a second exemplary electrolytic capacitor embodiment 78 in accordance with the present subject matter includes surface mount terminations with wrap-around features. Referring to FIG. 6a, a capacitor body 4 is provided with an anode wire 34 embedded therein. An optional washer 38 or alternative feature may be provided around anode wire 34. An anode termination comprises first portion 56 and second portion 58, similar to the anode termination of capacitor embodiment 26 of FIGS. 4a and 4b. The anode termination of electrolytic capacitor 78 further comprises a third anode termination portion 80 and fourth anode termination portion 82. A cathode termination comprises first portion 44 and second portion 46, similar to the cathode termination of electrolytic capacitor 26 of FIGS. 4a and 4b. The cathode termination further comprises a third cathode termination portion 84 and fourth cathode termination portion 86.

Figure 7:
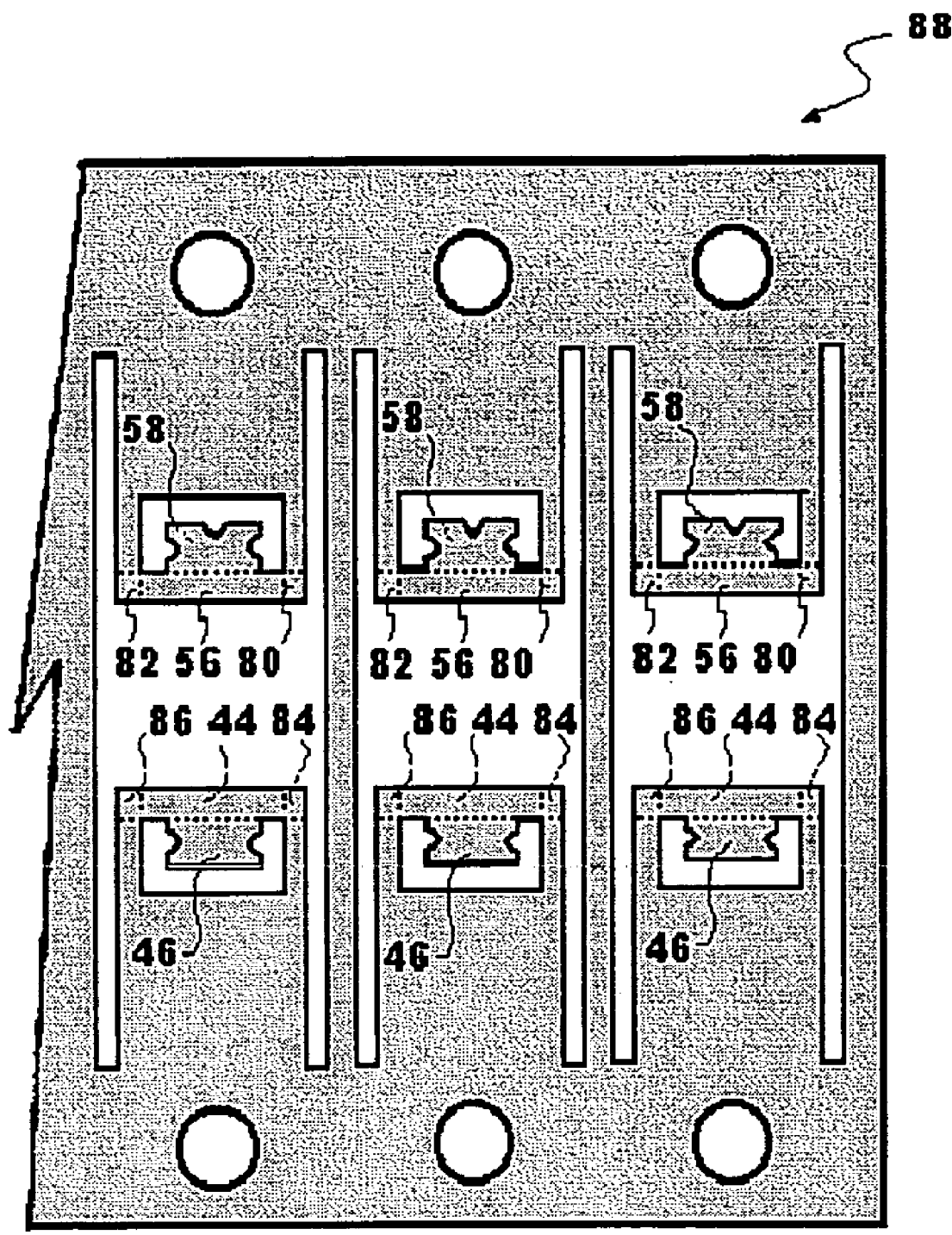
FIG. 7 illustrates an exemplary termination frame for use in accordance with the second exemplary surface mount electrolytic capacitor embodiment disclosed in FIGS. 6a through 6d, respectively.

All four portions of each respective anode and cathode terminations are initially provided in a single flat termination frame 88 as depicted in FIG. 7. The second cathode termination portion 46 is bent up in a generally perpendicular fashion to first cathode termination portion 44, at which point the cathode termination may be "glued" to the cathode layer of capacitor body 4. Second anode termination portion 58 may then be bent up to be generally perpendicular to first anode termination portion 56 and adjacent to anode wire 34, at which point the anode wire 38 and second termination portion 58 may be welded together.

Referring still to the second electrolytic capacitor embodiment 78 of FIG. 6a, an insulation pad 90 may be provided between the first anode termination portion 56 and capacitor body 4 to provide electrical insulation and to reduce the possibility of the capacitor body 4 shorting out to the anode wire 34. Such insulation pad 90 may be formed of insulation tape or of a insulation material sprayed onto the desired location within capacitor 78. It should be appreciated that the insulation pad 90 shown with respect to FIG. 6a may be incorporated into the design of any electrolytic capacitor structure of the present subject matter, including the first exemplary electrolytic capacitor embodiment 26, and other exemplary embodiments presented hereafter.

Figure 6B:
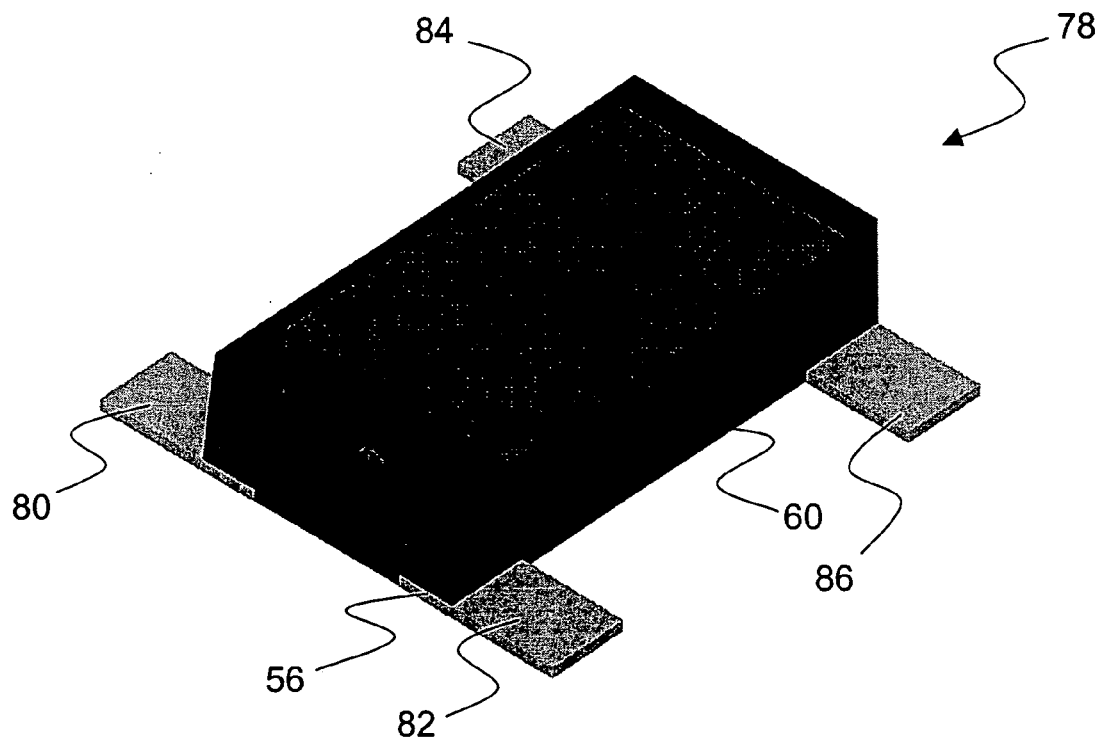
FIG. 6b displays a side view with top perspective of a second exemplary surface mount electrolytic capacitor embodiment of the disclosed technology after encapsulation but before final termination formation.

After accomplishing the exemplary steps discussed above, a thermoplastic or thermoset resin material may encapsulate portions of capacitor 78 in a molded package 60 as shown in FIG. 6b. Molded package 60 preferably leaves part of the first, third, and fourth respective portions of the anode and cathode terminations exposed. First anode termination portion 56 and first cathode termination portion 44 are arranged in a generally coplanar relationship with one another.

Figure 6C:
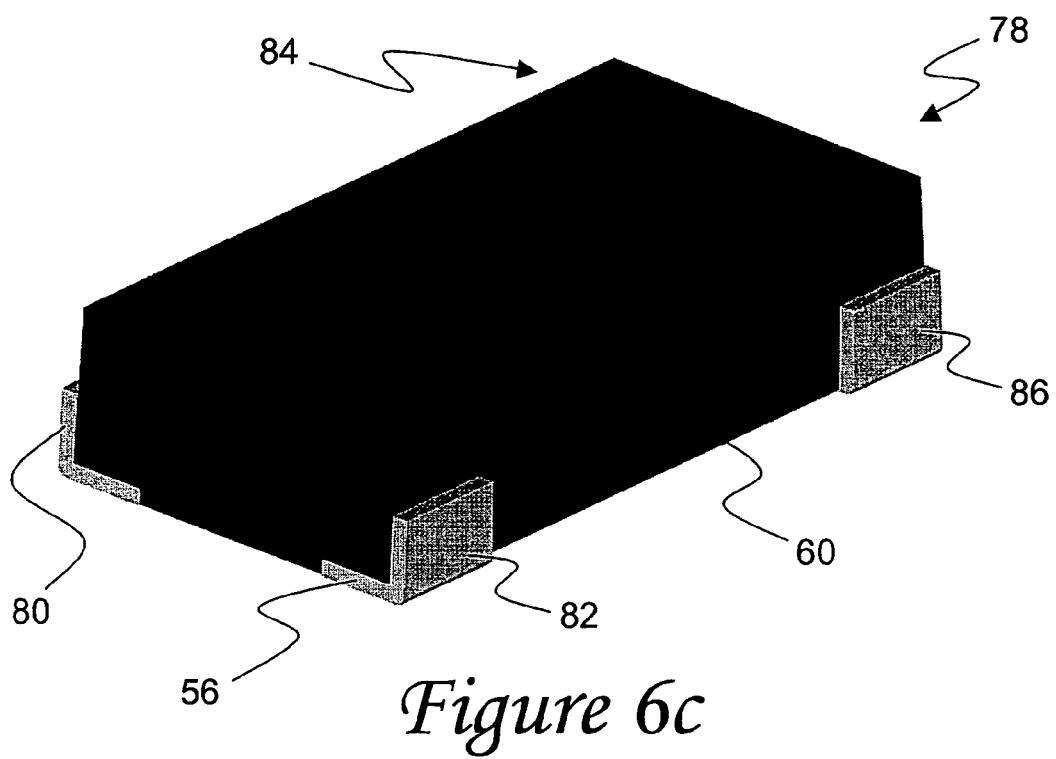
FIG. 6c displays a side view with top perspective of a second exemplary surface mount electrolytic capacitor embodiment of the disclosed technology after encapsulation and after final termination formation.
Figure 6D:
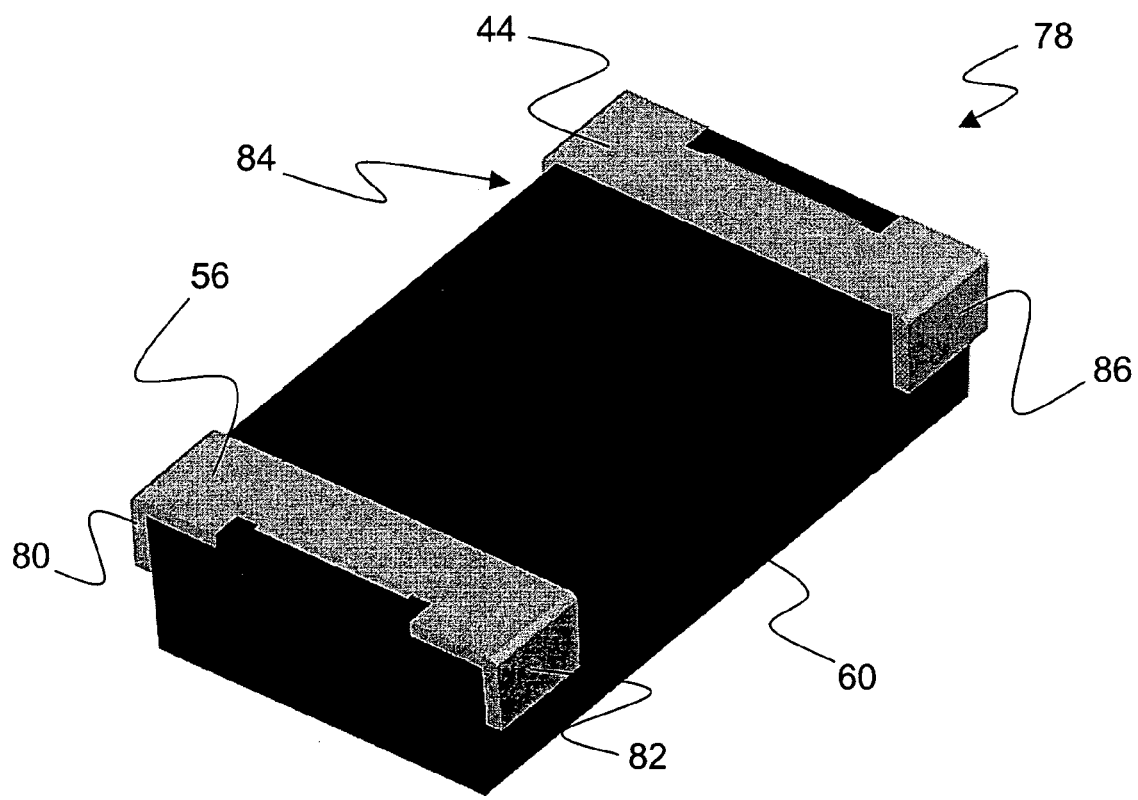
FIG. 6d displays a side view with bottom perspective of a second exemplary surface mount electrolytic capacitor embodiment of the disclosed technology after encapsulation and after final termination formation.

After encapsulating selected portions of capacitor 78, the third anode termination portion 80 and fourth anode termination portion 82 are bent up in a generally perpendicular fashion to first anode termination portion 56 as shown in FIGS. 6c and 6d. Final positioning of such portions 80 and 82 of electrolytic capacitor 78 are preferably respectively provided along opposing surfaces of molded package 60, wherein the selected opposing surfaces are adjacent to the bottom surface corresponding to first anode termination portion 56. The third and fourth anode termination portions 80 and 82 may be secured to molded package 60 via conductive epoxy or other adhesive features.

With further reference to FIGS. 6c and 6d, the third cathode termination portion 84 and fourth cathode termination portion 86 are bent up in a generally perpendicular fashion to first cathode termination portion 44. Final positioning of such portions 84 and 86 of electrolytic capacitor 78 are preferably respectively provided along opposing surfaces of molded package 60, wherein the selected opposing surfaces are adjacent to the bottom surface corresponding to first cathode termination portion 44. The third and fourth cathode termination portions 84 and 86 may be secured to molded package 60 via conductive epoxy or other adhesive features. Anode termination portion 80 and cathode termination portion 84 are preferably arranged on the same side of molded package 60, while anode termination portion 82 and cathode termination portion 86 preferably reside on another same selected side.

Figure 8A:
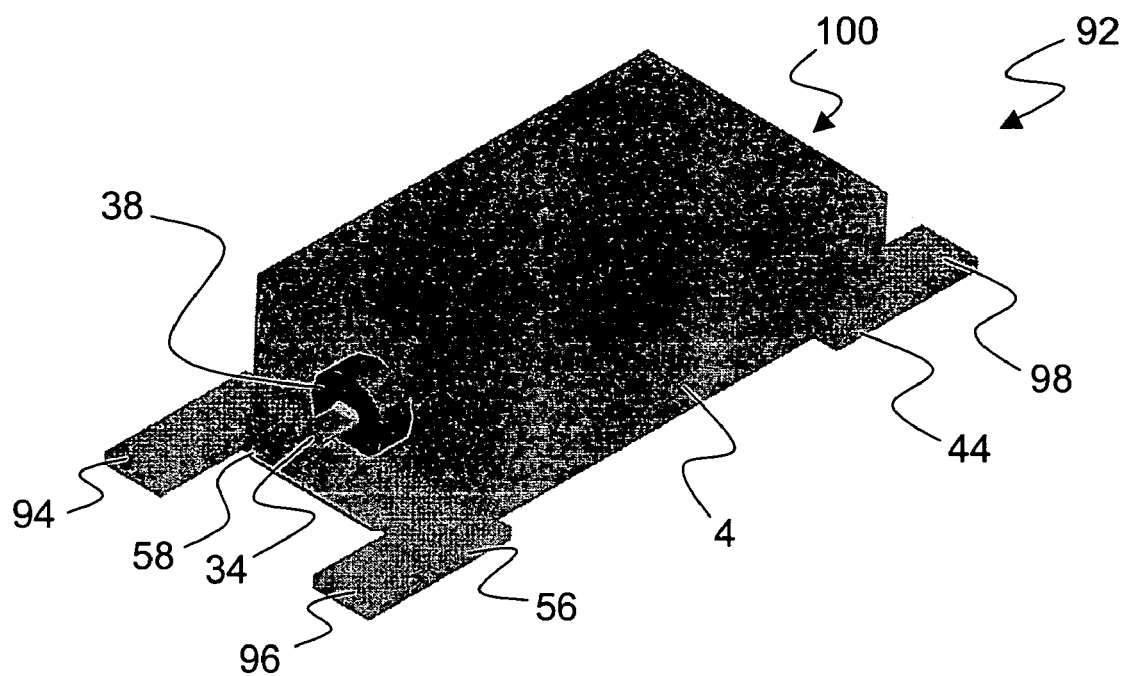
FIG. 8a displays a side view with top perspective of a third exemplary surface mount electrolytic capacitor embodiment of the disclosed technology before encapsulation.

Now referring to FIGS. 8a–8d, respectively, a third exemplary electrolytic capacitor embodiment 92 in accordance with the present subject matter includes surface mount terminations with alternative wrap-around features. Referring to FIG. 8a, a capacitor body 4 is provided with an anode wire 34 embedded therein or welded thereto. An optional washer 38 or alternative feature may be provided around anode wire 34. An anode termination comprises first portion 56 and second portion 58, similar to the anode termination of previously discussed electrolytic capacitor embodiments 26 and 78. The anode termination of electrolytic capacitor 92 further comprises a third anode termination portion 94 and fourth anode termination portion 96. A cathode termination comprises first portion 44 and second portion 46, similar to the cathode termination of previously discussed electrolytic capacitors 26 and 78. The cathode termination further comprises a third cathode termination portion 98 and fourth cathode termination portion 100.

Figure 9:
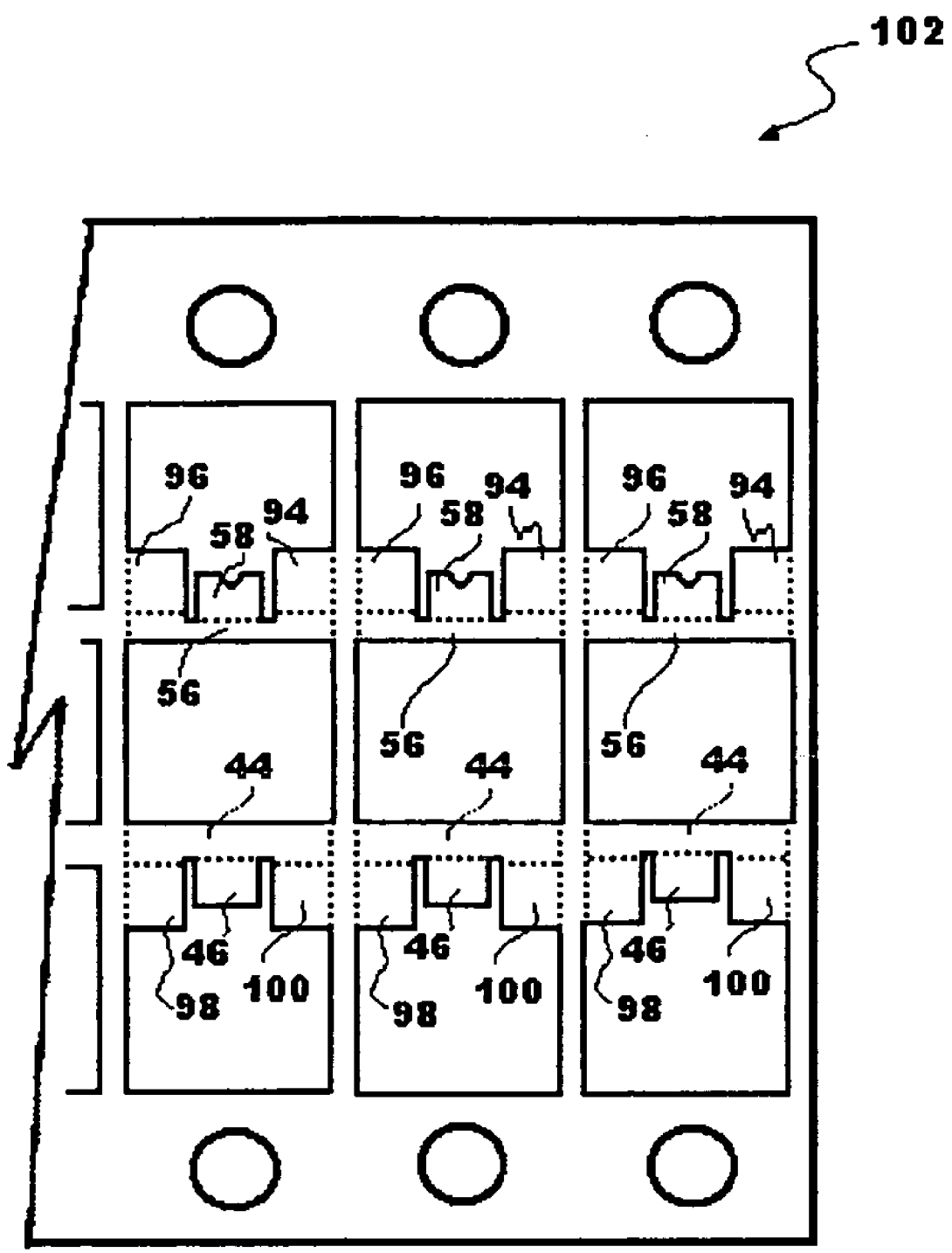
FIG. 9 illustrates an exemplary termination frame for use in accordance with the third exemplary surface mount electrolytic capacitor embodiment disclosed in FIGS. 8a through 8d, respectively.

All four portions of each respective anode and cathode terminations are initially provided in a single flat termination frame 102 as depicted in FIG. 9. The second cathode termination portion 46 is bent up in a generally perpendicular fashion to first cathode termination portion 44, at which point the cathode termination may be "glued" to the cathode layer of capacitor body 4. Second anode termination portion 58 may then be bent up to be generally perpendicular to first anode termination portion 56 to be adjacent to anode wire 34, at which point the anode wire 38 and second termination portion 58 may be welded together. Insulation tape (as discussed with reference to FIG. 6a) may be provided between the first anode termination portion 56 and anode wire 34 of electrolytic capacitor 92.

Figure 8B:
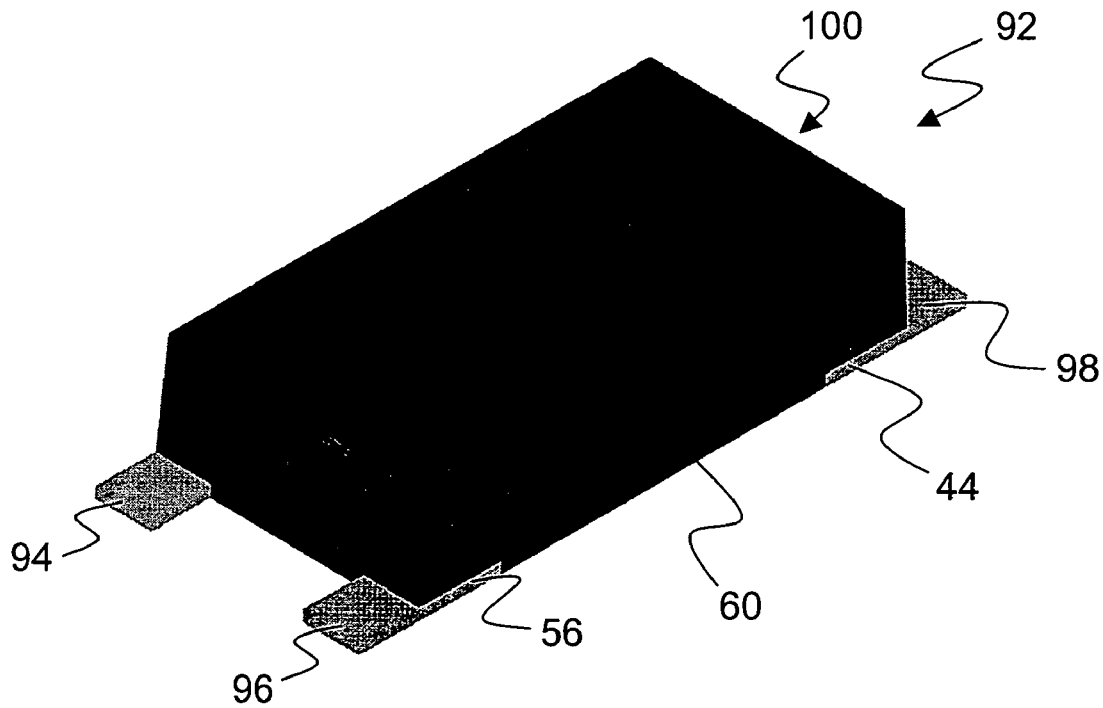
FIG. 8b displays a side view with top perspective of a third exemplary surface mount electrolytic capacitor embodiment of the disclosed technology after encapsulation but before final termination formation.

After accomplishing the exemplary steps discussed above, a thermoplastic or thermoset resin material may encapsulate portions of capacitor 92 in a molded package 60 as shown in FIG. 8b. Molded package 60 preferably leaves part of the first, third, and fourth respective portions of the anode and cathode terminations exposed. First anode termination portion 56 and first cathode termination portion 44 are arranged in a generally coplanar relationship with one another.

Figure 8C:
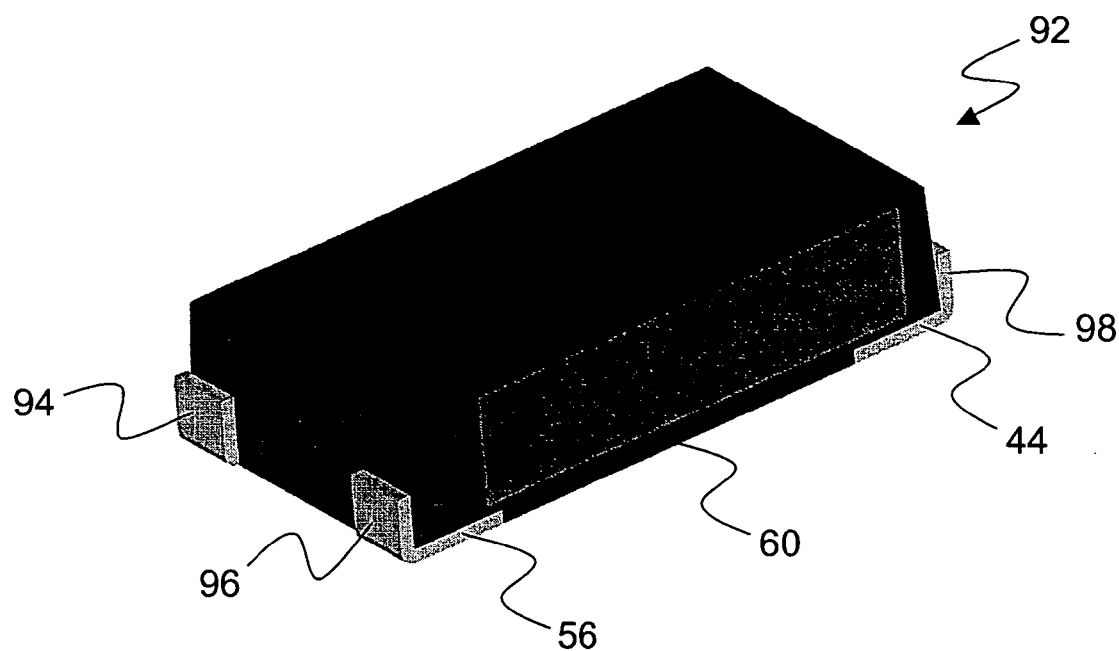
FIG. 8c displays a side view with top perspective of a third exemplary surface mount electrolytic capacitor embodiment of the disclosed technology after encapsulation and after final termination formation.
Figure 8D:
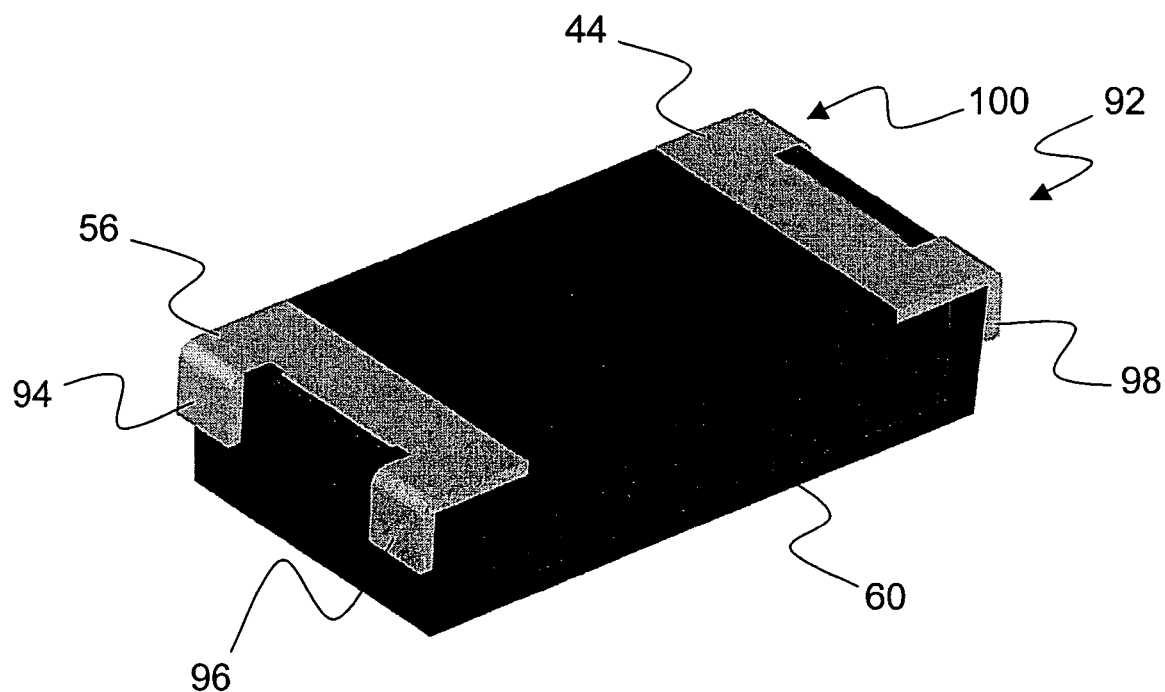
FIG. 8d displays a side view with bottom perspective of a third exemplary surface mount electrolytic capacitor embodiment of the disclosed technology after encapsulation and after final termination formation.

After encapsulating selected portions of capacitor 92, the third anode termination portion 94 and fourth anode termination portion 96 are bent up in a generally perpendicular fashion to first anode termination portion 56 as shown in FIGS. 8c and 8d. Final positioning of such portions 94 and 96 of electrolytic capacitor 92 are preferably both provided along a single selected surface of molded package 60, wherein the selected surface is adjacent to the bottom surface corresponding to first anode termination portion 56. The third and fourth anode termination portions 94 and 96 may be secured to molded package 60 via conductive epoxy or other adhesive features.

With further reference to FIGS. 8c and 8d, the third cathode termination portion 98 and fourth cathode termination portion 100 are bent up in a generally perpendicular fashion to first cathode termination portion 44. Final positioning of such portions 98 and 100 of electrolytic capacitor 92 are preferably both provided along a single selected surfaces of molded package 60, wherein the selected surface is adjacent to the bottom surface corresponding to first cathode termination portion 44. The third and fourth cathode termination portions 98 and 100 may be secured to molded package 60 via conductive epoxy or other adhesive features. The side of molded package 60 on which anode termination portions 94 and 96 are provided preferably opposes the side of molded package 60 on which cathode termination portions 98 and 100 are provided.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A surface mount electrolytic capacitor comprising:
   an anode body;
   a cathode layer substantially surrounding said anode body and yielding a capacitor body characterized by a top and bottom surface;
   an anode lead with a first end connected to said anode body and a second end extending therefrom;
   an anode termination that is in electrical connection with said anode lead, said anode termination comprising a first portion provided generally parallel to said bottom surface of said capacitor body;
   an insulation pad positioned between said first portion of said anode termination and said capacitor body;
   a cathode termination that comprises a first portion and a second portion, said first portion of said cathode termination being provided generally parallel to said bottom surface of said capacitor body, and said second portion of said cathode termination being provided generally perpendicular to said first portion of said cathode termination, wherein said second portion of said cathode termination is in electrical connection with said cathode layer; and a package that encapsulates said capacitor body in such a manner that only said first portion of said anode termination and said first portion of said cathode termination are exposed.

2. The capacitor of claim 1, wherein said anode termination further comprises a second portion that is provided generally perpendicular to said first portion of said anode termination.

3. The capacitor of claim 2, wherein said second portion of said anode termination is in electrical connection with said anode lead.

4. The capacitor of claim 3, wherein said second portion of said anode termination is in electrical connection with said anode lead via a metal weld.

5. The capacitor of claim 2, wherein said second portion of said anode termination has a height greater than its thickness.

6. The capacitor of claim 1, wherein said first portion of said cathode termination is in electrical connection with said cathode layer.

7. The capacitor of claim 6, wherein said first portion of said cathode termination is in electrical connection with said cathode layer via a conductive adhesive.

8. The capacitor of claim 1, wherein said second portion of said cathode termination is in electrical connection with said cathode layer via a conductive adhesive.

9. The capacitor of claim 1, wherein said first portion of said cathode termination has a U-shaped configuration.

10. The capacitor of claim 1, wherein said first portion of said anode termination has a U-shaped configuration.

11. The capacitor of claim 1, wherein a surface of said package is substantially coplanar with said first portion of said anode termination and said first portion of said cathode termination.

12. The capacitor of claim 1, wherein said package is generally rectangular.

13. The capacitor of claim 1, further comprising a washer that generally surrounds said anode lead.

14. The capacitor of claim 1, wherein said first end of said anode lead is embedded within said anode body.

15. The capacitor of claim 1, wherein said first end of said anode lead is welded to said anode body.

16. The capacitor of claim 1, wherein the profile of the capacitor is less than about 0.050 inches.

17. The capacitor of claim 1, wherein the volumetric efficiency of the capacitor is at least about 50 percent.

18. The capacitor of claim 1, wherein said capacitor body further comprises at least one additional layer between said anode body and said cathode layer.

19. The capacitor of claim 18, wherein said additional layer is an oxide layer.

20. The capacitor of claim 1, wherein said anode body comprises tantalum.

21. The capacitor of claim 1, wherein said anode body comprises niobium.

22. The capacitor of claim 21, wherein said anode body comprises an oxide of niobium.

23. The capacitor of claim 1, wherein said anode body comprises aluminum or titanium.

24. The capacitor of claim 1, wherein said second portion of said cathode termination has a height greater than its thickness.

25. A surface mount electrolytic capacitor comprising:
an anode body;
a cathode layer substantially surrounding said anode body and yielding a capacitor body characterized by a top and bottom surface;
an anode lead with a first end connected to said anode body and a second end extending therefrom;
an anode termination that comprises a first portion provided generally parallel to said bottom surface of said capacitor body, and a second portion provided generally perpendicular to said first portion of said anode termination, wherein said second portion of said anode termination is in electrical connection with said anode lead;
a cathode termination that comprises a first portion and a second portion, said first portion of said cathode termination being provided generally parallel to said bottom surface of said capacitor body, and said second portion of said cathode termination being provided generally perpendicular to said first portion of said cathode termination, wherein said first and second portions of said cathode termination are in electrical connection with said cathode layer; and
a molded resin package that encapsulates said capacitor body in such a manner that only said first portion of said anode termination and said first portion of said cathode termination are exposed, wherein a surface of said package is substantially coplanar with said first portion of said anode termination and said first portion of said cathode termination.

26. The capacitor of claim 25, wherein said first portion of said cathode termination has a U-shaped configuration.

27. The capacitor of claim 25, wherein said first portion of said anode termination has a U-shaped configuration.

28. The capacitor of claim 25, wherein said capacitor body comprises an oxide layer between said anode body and said cathode layer.

29. The capacitor of claim 25, wherein said anode body comprises tantalum.

30. The capacitor of claim 25, wherein said anode body comprises niobium.

31. The capacitor of claim 30, wherein said anode body comprises an oxide of niobium.

32. The capacitor of claim 25, wherein said anode body comprises aluminum or titanium.

33. A surface mount electrolytic capacitor comprising:
an anode body, wherein said anode body comprises at least one metal selected from the group consisting of tantalum, niobium, aluminum, and titanium;
an oxide layer;
a cathode layer substantially surrounding said anode body and said oxide layer, and yielding a capacitor body characterized by a top and bottom surface;
an anode lead with a first end connected to said anode body and a second end extending therefrom;
an anode termination that comprises a first portion provided generally parallel to said bottom surface of said capacitor body, and a second portion provided generally perpendicular to said first portion of said anode termination, wherein said second portion of said anode termination is in electrical connection with said anode lead;
a cathode termination that comprises a first portion and a second portion, said first portion of said cathode termination being provided generally parallel to said bottom surface of said capacitor body, and said second portion of said cathode termination being provided generally perpendicular to said first portion of said cathode termination, wherein said first and second portions of said cathode termination are in electrical connection with said cathode layer; and a molded resin package that encapsulates said capacitor body in such a manner that only said first portion of said anode termination and said first portion of said cathode termination are exposed, wherein a surface of said package is substantially coplanar with said first portion of said anode termination and said first portion of said cathode termination.

34. The capacitor of claim 15, wherein said first end of said anode lead is laser welded to said anode body.

35. A surface mount electrolytic capacitor comprising:
an anode body;
a cathode layer substantially surrounding said anode body and yielding a capacitor body characterized by a top and bottom surface;
an anode lead with a first end connected to said anode body and a second end extending therefrom;
an anode termination that comprises a first portion provided generally parallel to said bottom surface of said capacitor body, and a second portion provided generally perpendicular to said first portion of said anode termination, wherein said second portion of said anode termination has a height greater than its thickness, and wherein said second portion of said anode termination is in electrical connection with said anode lead;
a cathode termination that comprises a first portion and a second portion, said first portion of said cathode termination being provided generally parallel to said bottom surface of said capacitor body, and said second portion of said cathode termination being provided generally perpendicular to said first portion of said cathode termination, wherein said second portion of said cathode termination has a height greater than its thickness, and wherein said first and second portions of said cathode termination are in electrical connection with said cathode layer; and
a molded resin package that encapsulates said capacitor body in such a manner that only said first portion of said anode termination and said first portion of said cathode termination are exposed, wherein a surface of said package is substantially coplanar with said first portion of said anode termination and said first portion of said cathode termination.

36. The capacitor of claim 35, wherein said first portion of said cathode termination has a U-shaped configuration.

37. The capacitor of claim 35, wherein said first portion of said anode termination has a U-shaped configuration.

38. The capacitor of claim 35, wherein said anode body comprises tantalum.

39. The capacitor of claim 35, wherein said anode body comprises an oxide of niobium.

40. The capacitor of claim 35, wherein said first end of said anode lead is laser welded to said anode body.

\* \* \* \* \*